Patented Oct. 14, 1947

2,428,843

UNITED STATES PATENT OFFICE 2,428,843

FLAME-RESISTANT CELLULOSIC MATERIAL AND PROCESS FOR PRODUCING SAME

Louis W. Georges, Columbus, Ohio, and Carl Hamalainen, New Orleans, La., assignors to United States of America, as represented by the Secretary of Agriculture No Drawing. Application August 28, 1945, Serial No. 613,192

4 Claims. (Cl. 8—116.2)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

This invention relates to flame-resistant fibrous cellulosic materials, and in particular to cotton, linen and other vegetable fibrous materials in which the fibrous structure of the original material is retained.

Heretofore, fireproofing of combustible materials such as cotton textile has been accomplished by addition of substantial amounts of various inorganic and organic compounds, oxides of easily reducible metals, products containing halogen, and so forth. Some of these added materials are water-soluble, and therefore produce a textile subject to the leaching action of water, while others produce a fabric which is stiff and boardy.

It is an object of the present invention to provide a cellulosic fibrous material, such as cotton, with a fire retardant which is an integral part of the cellulose, being chemically combined with the cellulose molecule, and in which the fireproofing effect will be retained permanently irrespective of washing.

Another object is to prepare a fire-resistant derivative of the cellulose in the textile in which there is substantially no impairment of the fiber structure and loss in tensile strength.

In general, according to the invention, the cellulosic fiber, particularly cotton fiber, is reacted with a hot solution of a halogen substituted aryl isocyanate, particularly a halogen-substituted phenyl isocyanate, preferably 2,4,6-trichlorophenyl isocyanate in a tertiary organic base, particularly pyridine, to form a carbamyl ester type of derivative of the cellulose. The reaction is conducted under anhydrous conditions.

In the reaction which takes place between the halogen aryl isocyanate and the cellulose, the isocyanate group adds on to hydroxyl groups of the cellulose to form the carbamyl derivative of the cellulose, with no elimination of elements or groups of elements as by-products of the reaction which might degrade the cellulose molecule by hydrolytic or oxidative means and have a deleterious effect on the fiber strength.

The manner of preparing several of the halogen-substituted aryl isocyanates suitable for the process is given below. These compounds are believed to be new.

*Preparation of 2,5-dichlorophenyl isocyanate.* —Forty-five grams of 2,5-dichloroaniline hydrochloride was suspended in 500 cc. of chlorobenzene. Phosgene gas was passed through the suspension in a steady stream with continuous stirring, during which time the temperature of the reaction mixture was gradually raised until the solvent began to reflux. The phosgene gas was passed into the reaction mixture until the solution became clear. The resulting solution was distilled in vacuo to remove the solvent.

The residue is the clear, colorless, 2,5-dichlorophenyl isocyanate boiling at 83°–84° C. at 3 to 4 mm. pressure. This isocyanate reacts readily with water in the presence of pyridine to yield the colorless, crystalline di-(2,5-dichlorophenyl) urea melting at 289° C. An analysis of the urea compound gives 7.9% nitrogen and 40.0% chlorine. (Theory, N=8.0%, Cl=40.6%.)

*Preparation of 2,4,6-trichlorophenyl isocyanate.* —Fifty grams of 2,4,6-trichloroaniline hydrochloride was suspended in 500 cc. of chlorobenzene. Phosgene gas was passed through the suspension in a steady stream with continuous stirring during which time the temperature of the reaction mixture was gradually raised until the solvent began to reflux. The phosgene gas was passed into the reaction mixture until the solution became clear. At this stage, a small amount of a crystalline compound (the disubstituted urea compound) separated and was filtered out. The clear filtrate was then distilled in vacuo to remove the solvent. The hot residue was poured into a crystallizing dish and stored in a vacuum desiccator where, upon cooling, the 2,4,6-trichlorophenyl isocyanate crystallized. The colorless, crystalline mass was recrystallized from petroleum ether.

The resulting 2,4,6-trichlorophenyl isocyanate crystals melt at 64°–65° C. An analysis of the product gives 5.9% nitrogen and 47.3% chlorine. (Theory, N=6.3%, Cl=47.9%.) This isocyanate reacts with water in the presence of pyridine to give the di-(2,4,6-trichlorophenyl) urea melting at 295° C.

*Preparation of 2,4,6-tribromophenyl isocyanate.*—Forty-five grams of 2,4,6-tribromoaniline was dissolved in 500 cc. of chlorobenzene. Dry gaseous HCl was led into the solution with stirring until a voluminous precipitate of the 2,4,6-tribromoaniline hydrochloride was formed. Phosgene gas was then passed through the reaction mixture in a steady stream with continuous stirring, during which time the temperature of the reaction mixture was gradually raised until the solvent began to reflux. The phosgene was passed into the reaction mixture until the solution became clear. At this stage, an appreciable amount of a crystalline material (the disubstituted urea compound) separated and was filtered out. The clear filtrate was then distilled until nearly free of solvent. The hot residue was poured into a crystallizing dish and stored in a vacuum desiccator where, upon cooling, the 2,4,6-tribromophenyl isocyanate crystallized.

An analysis of the isocyanate thus obtained gives 3.9% nitrogen and 66.8% bromine. Theory, $N=3.9\%$, $Br=67.5\%$.) This isocyanate can be recrystallized from petroleum ether forming colorless crystals melting at 92°–94° C. It is soluble in pyridine and on the addition of water, it forms the di-(2,4,6-tribromophenyl) urea melting at 323° C.

The following examples illustrate the process of treating the cellulosic fiber.

Example I

Two grams of lint cotton was first extracted with hot 95% ethanol and then with hot 1% sodium hydroxide solution. The cotton was then dried by adding benzene and distilling off the water azeotropically. Four and one-half grams of the 2,5-dichlorophenyl isocyanate (representing 2 mols of the isocyanate per glucose unit of the cotton) dissolved in 100 cc. of dry pyridine was added to the dried cotton. The reaction mixture was heated in an oil bath maintained at 122°–125° C. for 22 hours. The cotton thus treated was filtered from the reaction mixture, washed successively in fresh pyridine, ethanol, and water, respectively, and then dried in a current of warm air.

The resulting product, in which the cellulose is partially converted to 2,5-dichlorophenyl carbamate, represented a gain of 223% in weight over the unreacted cotton. The fibers are coarse and stiff but are resistant to burning. An analysis gave 5.1% nitrogen and 25.8% chlorine corresponding to 1.9 carbamate groups per glucose unit.

Example II

A 2-gram sample of dried cotton was treated in a manner similar to that of Example I, except that 5.2 g. of 2,4,6-trichlorophenyl isocyanate (representing 2 mols of the isocyanate per glucose unit of the cotton) was used instead of the 2,5-dichlorophenyl isocyanate.

The resulting product, in which the cellulose is partially converted to 2,4,6-trichlorophenyl carbamate, represented a gain of 205% in weight over the initial material. It is fibrous but the fibers are somewhat hardened and brittle, and are resistant to burning. An analysis gave 4.3% nitrogen and 31.3% chlorine corresponding to 1.8 carbamate groups per glucose unit.

Example III

One and seven-tenths grams of lint cotton, extracted and dried as in Example I, was treated with 3.6 g. of the 2,4,6-tribromophenyl isocyanate (representing 1 mol of the isocyanate per glucose unit of the cotton) dissolved in 60 cc. of dry pyridine. The reaction mixture was heated in an oil bath maintained at 122° C. for 23 hours. The cotton thus treated was filtered, washed with pyridine, ethanol, and water, respectively, and then dried in a current of warm air.

The resulting product, in which the cellulose is partially converted to 2,4,6-tribromophenyl carbamate, represented a gain of 105% in weight over the unreacted material. It is fibrous, soft and fire resistant. An analysis gave 2.1% nitrogen and 36.0% bromine corresponding to 0.54 carbamate groups per glucose unit.

Example IV

A strip of white cotton duck weighing 2.4 g. was dried by washing in benzene and distilling all but residual benzene from it. The dried cotton duck was treated with 5.3 g. of the 2,4,6-tribromophenyl isocyanate (representing 1 mol of the isocyanate per glucose unit of the cotton) dissolved in 50 cc. of dry pyridine. The reaction mixture was heated in an oil bath maintained at 122° C. for 23 hours. The sample thus treated was washed in fresh pyridine, ethanol, and water, respectively, and then dried.

The treated material is stiffer than a corresponding untreated sample and is fire resistant. The gain in weight was 98% and represents the addition of 0.47 carbamate group per glucose unit.

The extent of fire resistance of fibrous cellulosic products treated in accordance with this invention depends upon various factors, such as the amount of carbamyl substitution on the cellulose molecule, the degree of halogen substitution on the aryl group of the isocyanate compound, and the kind of halogen employed.

It is desirable to have the minimum of carbamyl substitution on the cellulose molecule, since there is a gradual loss of fibrous structure as the number of carbamyl groups approaches the theoretical maximum of three. In order to obtain the optimum flame resistance with a minimum of carbamyl substitution, it is preferable to use a phenyl isocyanate containing the required type and number of halogen substituents.

Other halogenated aryl isocyanates besides phenyl may be used in the process. Also, alkyl and acyl isocyanates, as well as iso-thiocyanates that contain a substantial amount of halogen substitution, may be used.

Having thus described the invention, what is claimed is:

1. A process for preparing a flame-resistant fibrous cellulosic material comprising reacting an anhydrous vegetable fibrous cellulosic material with a hot solution of 2,4,6-trichlorophenyl isocyanate in pyridine.

2. The material produced by the process of claim 1.

3. The process of claim 1 in which the cellulosic material is cotton.

4. The material produced by the process of claim 3.

LOUIS W. GEORGES.
CARL HAMALAINEN.

REFERENCES CITED

The following references are of record in the file of this patent:

UNITED STATES PATENTS

| Number | Name | Date |
|---|---|---|
| 2,225,661 | Schirm (1) | Dec. 24, 1940 |
| 2,303,364 | Schirm (2) | Dec. 1, 1942 |
| 2,343,920 | Maxwell | Mar. 14, 1944 |
| 2,350,188 | Pinkney | May 30, 1944 |
| 2,370,405 | Kaase et al. | Feb. 27, 1945 |

FOREIGN PATENTS

| Number | Country | Date |
|---|---|---|
| 461,179 | Great Britain | Feb. 8, 1937 |
| 474,403 | Great Britain | Nov. 1, 1937 |
| 488,783 | Great Britain | July 13, 1938 |